United States Patent Office 3,143,526
Patented Aug. 4, 1964

3,143,526
LINEAR POLYESTERS OF 1,4-CYCLOHEXANEDI-
CARBOXYLIC ACID AND AROMATIC DIOLS
John R. Caldwell and Russell Gilkey, Kingsport, Tenn.,
assignors to Eastman Kodak Company, Rochester,
N.Y., a corporation of New Jersey
No Drawing. Filed May 23, 1960, Ser. No. 31,216
18 Claims. (Cl. 260—47)

This invention relates to polyesters of 1,4-cyclohexanedicarboxylic acid and bisphenols which are very high melting and at the same time are soluble in methylene chloride so that fibers or films can be made by solution spinning or dope-casting. These polyesters quite surprisingly have high heat distortion temperatures and hydrolytic stability. Solubility in methylene chloride is quite surprising in view of the high melting points and high inherent viscosities.

Polyesters from 1,4-cyclohexanedicarboxylic acid and various dihydroxy compounds are well known. The same applies to polyesters of various dicarboxylic acids and bisphenols. However, the polyesters of the present invention are novel and there is nothing known in the art that would detract from the unobviousness of the discovery of an especially advantageous combination of physical and chemical properties.

It is an object of this invention to provide new and useful polyesters having unobviously excellent properties as to high melting points, high solubility in some common organic solvents, hydrolytic stability, high heat distortion temperatures, low moisture absorption, good oxidative stability, high impact strength, toughness and other properties in an especially advantageous combination useful for such purposes as photographic film support which can be made by traditional dope coating techniques and yet possesses improved properties compared to cellulose esters, bisphenol A polycarbonates and the like.

Other objects will become apparent elsewhere in this specification.

According to a preferred embodiment of this invention there is provided a linear, highly polymeric fiber-forming polyester of (A) A dibasic carboxylic acid consisting of no more than two different members selected from the group consisting of:
 (1) From 50 to 100 mole percent of trans-1,4-cyclohexanedicarboxylic acid,
 (2) From 0 to 50 mole percent of one member selected from the group consisting of 4,4'-sulfonyldibenzoic acid, 4,4'-diphenic acid, terephthalic acid, isophthalic acid, cis-1,4-cyclohexanedicarboxylic acid and aliphatic dicarboxylic acids having from 1 to 10 carbon atoms,
(B) From one to two diols selected from the group consisting of:
 (a) One diol esentially composed of a 4,4'-dihydroxydiaryl substituted hydrocarbon wherein said hydrocarbon is a divalent aliphatic radical having from 1 to 20 carbon atoms and each of said aryl radicals is of a member of the benzene series containing from 6 to 9 carbon atoms and from none to two chlorine atoms, provided said constituent defined in (A) is composed of 50 to 90 mole percent of said acid (1) and 10 to 50 mole percent of said acid (2), and (b) The combination of 0 to 50 mole percent of one diol as defined in (a) and another such a diol as defined in (a) having from 4 to 40 carbons in said divalent aliphatic radical,
(c) 1,4-dihydroxynaphthalene and partially hydrogenated derivatives thereof in which the hydroxy radicals are attached to an aryl nucleus, and
(d) 9,10-dihydroxyanthracene and partially hydrogenated derivatives thereof in which the hydroxy radicals are attached to an aryl nucleus, said polyester melting at between 250° C. and 350° C. having an inherent viscosity of at least 0.55 and being soluble in methylene chloride.

The techniques for producing polyesters of the general type contemplated have been described in the art such as U.S. 2,035,578, U.S. 2,595,343, British 621,102, British 636,429, British 648,513 and other patents, the scientific literature, etc. Hence, there is no point in burdening the present specification with a lengthy discussion of how the polyesters of this invention can be prepared. The present invention insofar as it involves a process applies most particularly to the use of a new combination of constituents as well illustrated by the examples below.

The polyesters are conveniently made by employing an ester-interchange reaction between the dihydroxy compound and the phenyl or cresyl ester of the dicarboxylic acid. The reaction is facilitated by the use of a catalyst such as the oxide, hydride, or amide of an alkali or alkaline earth metal. Other suitable catalysts include zinc oxide, lead oxide, dibutyltin oxide, and sodium aluminate. The usual method of heating the reactants under vacuum is employed. It is preferred to build up the final molecular weight by the solid phase process in which the granulated polymer is heated in a vacuum at a temperature somewhat below the melting point.

Although any bisphenol might be used in such a process it is especially preferred in achieving the objects of this invention to use the designated bisphenols. A minor proportion thereof can be replaced with other aromatic dihydoxy compounds; see Angew. Chem., 68, 634 (1956).

The dihydroxy compounds of naphthalene and anthracene are useful. Other compounds of value are represented by

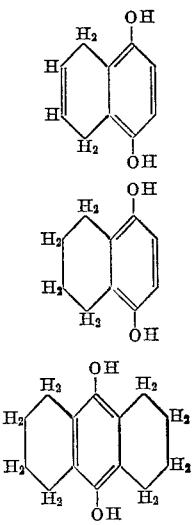

Another useful class is represented by the formula

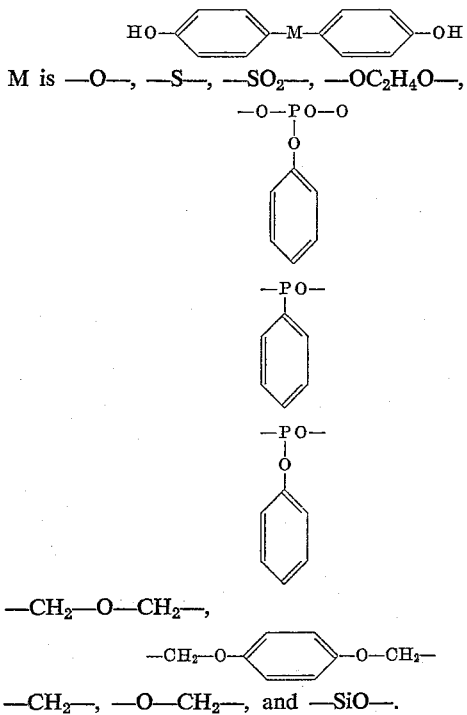

M is —O—, —S—, —SO₂—, —OC₂H₄O—,

—CH₂—, —O—CH₂—, and —SiO—.

Suitable aliphatic dicarboxylic acids include oxalic, dimethylmalonic, succinic, glutaric, adipic, pimelic, suberic, azelaic, sebacic, and 2-methyladipic, etc.

The alicyclic acids are of particular value as represented by 1,4-cyclohexanedicarboxylic acid, 1,3-cyclohexanedicarboxylic acid, 1,3-cyclopentanedicarboxylic acid, and 2,5(or 6)-bicycloheptanedicarboxylic acid. The cyclic acids can be used in their cis- or trans- forms.

Suitable aromatic dicarboxylic acids include terephthalic, isophthalic, 5-tert-butylisophthalic, diphenic, 4,4'-sulfonyldibenzoic, and 4,4-oxydibenzoic. For other dicarboxylic acids see U.S. Patent No. 2,720,506, column 7.

This invention can be further illustrated by the following examples of preferred embodiments although it will be understood that these examples are included merely for purposes of illustration and are not intended to limit the scope of the invention unless otherwise specifically indicated:

The following procedure was generally used to prepare the polymers of the various specific examples: (A) 1 mole proportion of trans-1,4-cyclohexanedicarboxylate diester including any modifying dibasic acid diester (phenyl or sometimes the cresyl ester), (B) about 1.1 mole proportion of the diol or a combination of diols, said (A) and (B) being about 20–30 grams, and about 1% by weight or less of sodium aluminate (e.g. 0.002 gram) were mixed in a 100 ml. flask equipped with a stirrer, a short reflux column with receiver and an inlet for nitrogen. Air was displaced from the flask by a nitrogen sweep. The mixture was melted down with stirring at 160° C. A vacuum of 30 mm. was applied and phenol was distilled out over a temperature range of 160–220° C. The pressure was reduced to about 0.5 mm. and the temperature raised to about 250° C. After about 15 minutes at about 250° C., the polymer had attained a high melt viscosity. It was removed from the flask and crystallized by soaking in acetone. The crystalline polymer was dried and ground to a particle size of 0.01 inch. At this stage, the inherent viscosity of the polymer, as measured in a solvent mixture of 60 parts phenol and 40 parts tetrachloroethane, was about 0.3. This prepolymer was further built up by heating the powder under a vacuum of 0.1 mm. with stirring at 260° C. to 300° C. for 2 to 3 hours. Variations of this process and more simple procedures were used in some of the examples.

Throughout this specification "trans" means 90–100% trans plus 0–10% cis isomers in admixture; generally at least 95% trans is contemplated.

In the following examples trans-1,4-cyclohexanedicarboxylic acid is abbreviated CHD-acid, terephthalic acid is abbreviated TP-acid and isophthalic acid is abbreviated IP-acid.

*Example 1*

CHD-acid diphenyl ester plus 4,4'-dihydroxydiphenyl-1,1-butane gave a polyester melting at 250°–260° C. which was soluble in methylene chloride. Film of excellent quality was dope-cast and had a heat distortion temperature of about 196° C.

In contrast when 100% TP-acid or 100% IP-acid was used the polyesters were insoluble in methylene chloride and are not covered by this invention.

As additional contrast, when a CHD-acid and 4,4'-dihydroxydiphenyl-2,2-propane polyester was prepared having an inherent viscosity above 0.55 it was insoluble in methylene chloride and is not covered by this invention.

*Example 2*

75 mole percent CHD-acid diphenyl ester plus 25 mole percent IP-acid diphenyl ester plus 4,4'-dihydroxy-diphenyl-2,2-propane gave a polyester melting at 265–280° C. which was soluble in methylene chloride and had a heat distortion temperature of 175° C. Other polyesters having inherent viscosities above 0.55 were prepared and had properties as shown in the following table which also includes Examples 1 and 2.

| Example No. | Acid and Diol | Softening or Melting Temp.,° C. | Heat Distort. Temp.,° C. |
|---|---|---|---|
| 1 | CHD acid+4,4'-dihydroxy-diphenyl-1,1-butane. | 250–260 | 196 |
| 2 | 75% CHD-acid+25% IP-acid+4,4'-dihydroxydiphenyl-2,2-propane. | 265–280 | 175 |
| 3 | 70% CHD-acid+30% TP-acid+4,4'-dihydroxydiphenyl-2,2-propane. | 310–325 | 189 |
| 4 | 75% CHD-acid+25% TP-acid+4,4'-dihydroxydiphenyl-1,1-cyclopentane. | 315–330 | 195 |
| 5 | CHD-acid+1,4-dihydroxy-5,6,7,8-tetrahydronaphthalene. | 290–310 | |
| 6 | CHD-acid+9,10 dihydroxy-1,2,3,4,5,6,7,8-octahydroanthracene. | >350 | |
| 7 | 80% CHD-acid+20% sebacic acid+4,4'-dihydroxydiphenyl-2,2-propane. | 270–300 | |
| 8 | CHD-acid+4,4'-dihydroxy-3,3'-dimethyldiphenyl-2,2-propane. | 265–280 | |
| 9 | CHD-acid+40% 4,4'-dihydroxydiphenyl-2,2-propane+60% 4,4'-dihydroxydiphenyl-1,1-isobutane. | 280–295 | |

The polyesters set forth in the preceding Examples 1–9 have inherent viscosities as measured in methylene chloride of at least 0.55 and are generally not much greater than 1.0 although such polyesters are valuable which have inherent viscosities as high as 2.0 or higher. Inherent viscosities, as measured in a solvent mixture of 60 parts phenol and 40 parts tetrachloroethane, were 0.99, 0.78 and 0.72 for Examples 1, 2 and 3, respectively. As already made evident from the preceding discussion and the examples, the solubility in methylene chloride and similar chlorinated organic solvents or mixtures with other organic solvents was quite surprising with regard to polymers of this type having such high melting points and inherent viscosities. This is especially true of the homopolymers containing only one dibasic carboxylic acid and only one diol.

The heat distortion temperatures referred to in the table above were measured by subjecting the polymer to a load of 50 pounds per square inch and observing the temperature at which a noticeable degree of elongation began to occur (about 2%).

The solubility of all of these polyesters in methylene chloride is very important because this solvent boils appreciably lower than ethylene dichloride or tetrachloroethane, etc. The low boiling point of the methylene chloride solvent is especially advantageous for the production of films on high-speed coating machines. Of course, the solvent can be composed of methylene chloride in admixture with other chlorinated hydrocarbons and/or other organic solvents. Moreover, the polymers of this invention are also soluble in chlorinated solvents such as ethylene dichloride, tetrachloroethane and some other common solvents.

The polyesters which have been illustrated are useful as photographic film base. The polyesters of Examples 1 and 4 are especially advantageous because of their high heat distortion temperatures which are important for photographic products used in the motion picture industry under intense lighting conditions and in other situations where usage at elevated temperatures is involved. The polyesters of this invention provide clear tough films for a variety of purposes including wrapping materials, magnetic tape base, dielectrics, upholstery, coatings, etc.

The polyesters of this invention are also characterized by being excellent molding plastics. They have excellent impact resistance and retain their properties at high temperatures.

The polyesters of this invention are in general characterized by outstanding hydrolytic stability, good oxidative resistance and low moisture absorption. Fabrics made from fibers of the polyesters have exceptional resistance to exposure to aqueous alkali, to boiling water, and to other adverse conditions.

Fibers can be prepared from the polyesters of this invention by ordinary dope spinning techniques and the fibers so produced have excellent characteristics with a minimum of subsequent mechanical and heat treatment.

Although the invention has been described in considerable detail with reference to certain preferred embodiments thereof, it will be understood that varaitions and modifications can be effected without departing from the spirit and scope of the invention as described hereinabove and as defined in the appended claims.

We claim:
1. A linear highly polymeric fiber-forming polyester of:
   component (A) consisting of from one to two dibasic carboxylic acids selected from the group consisting of trans-1,4-cyclohexanedicarboxylic acid, 4,4'-sulfonyldibenzoic acid, 4,4'-diphenic acid, terephthalic acid, isophthalic acid, cis-1,4-cyclohexanedicarboxylic acid and aliphatic dicarboxylic acids having from 1 to 10 carbon atoms, wherein at least 70 mole percent of said component (A) is said trans-1,4-cyclohexanedicarboxylic acid, and
   component (B) consisting of from one to two diols selected from the group consisting of:
      (a) 4,4'-dihydroxydiphenyl-2,2-propane,
      (b) a 4,4'-dihydroxydiaryl substituted hydrocarbon wherein said hydrocarbon is a divalent aliphatic radical having from 4 to 40 carbon atoms and each of said aryl radicals is a member of the benzene series containing from 6 to 9 carbon atoms and is substituted with from none to two chlorine atoms,
      (c) 1,4 - dihydroxynaphthalene and derivatives thereof in which as many as 4 nuclear hydrogen atoms have been added in which the hydroxy radicals are attached to an aryl nucleus, and
      (d) 9,10 - dihydroxyanthracene and derivatives thereof in which as many as 8 nuclear hydrogen atoms have been added in which the hydroxy radicals are attached to an aryl nucleus; and as to said polyester:
         (1) when said diol (a) is the sole diol, said acid component (A) must consist of from 70 to 90 mole percent of said trans-1,4-cyclohexanedicarboxylic acid and from 10 to 30 mole percent of one of said other acids,
         (2) said polyester melts at between 250° C. and 350° C.,
         (3) said polyester has an inherent viscosity of at least 0.55 as measured in methylene chloride, and
         (4) said polyester is soluble in methylene chloride.

2. A polyester as defined by claim 1 wherein said dibasic acid (A) is substantially entirely trans-1,4-cyclohexanedicarboxylic acid and said diol (B) is 4,4'-dihydroxydiphenyl-1,1-butane.

3. A polyester as defined by claim 1 wherein said dibasic acid (A) includes from about 10 to 30 mole percent terephthalic acid and said diol (B) is 4,4'-dihydroxydiphenyl-2,2-propane.

4. A polyester as defined by claim 1 wherein said dibasic acid (A) includes from about 10 to 30 mole percent isophthalic acid and said diol (B) is 4,4'-dihydroxydiphenyl-2,2-propane.

5. A polyester as defined by claim 1 wherein said dibasic acid (A) is substantially entirely trans-1,4-cyclohexanedicarboxylic acid and said diol (B) is 1,4-dihydroxy-5,6,7,8-tetrahydronaphthalene.

6. A polyester as defined by claim 1 wherein said dibasic acid (A) is substantially entirely trans-1,4-cyclohexanedicarboxylic acid and said diol (B) is 9,10-dihydroxy-1,2,3,4,5,6,7,8-octahydroanthracene.

7. A film of a polyester as defined by claim 1.
8. A film of the polyester as defined by claim 2.
9. A film of the polyester as defined by claim 3.
10. A film of the polyester as defined by claim 4.
11. A film of the polyester as defined by claim 5.
12. A film of the polyester as defined by claim 6.
13. A fiber of a polyester as defined by claim 1.
14. A fiber of a polyester as defined by claim 2.
15. A fiber of a polyester as defined by claim 3.
16. A fiber of a polyester as defined by claim 4.
17. A fiber of a polyester as defined by claim 5.
18. A fiber of a polyester as defined by claim 6.

References Cited in the file of this patent

UNITED STATES PATENTS

| | | |
|---|---|---|
| 2,035,578 | Wagner | Mar. 31, 1936 |
| 2,437,232 | Rothrock | Mar. 2, 1948 |
| 2,595,343 | Drewitt | May 6, 1952 |

OTHER REFERENCES

Conix: Ind. Eng. Chem., 52, 147–105 (February 1959).